United States Patent [19]

Fath et al.

[11] Patent Number: 5,792,228
[45] Date of Patent: Aug. 11, 1998

[54] ACCORDION FILTER PACK THAT IS BENDABLE IN ONLY ONE DIRECTION

[75] Inventors: Jürgen Fath, Weinheim; Harald Betz, Heidelberg, both of Germany

[73] Assignee: Firma Carl Fruedenberg, Weinheim, Germany

[21] Appl. No.: 728,458

[22] Filed: Oct. 10, 1996

[30] Foreign Application Priority Data

Dec. 2, 1995 [DE] Germany ................ 195 45 046.9

[51] Int. Cl.⁶ ............................................. B01D 46/52
[52] U.S. Cl. ............................ 55/497; 55/502; 55/511; 55/521
[58] Field of Search ..................... 55/497, 500, 509, 55/511, 502, 521

[56] References Cited

U.S. PATENT DOCUMENTS 2,189,704  2/1940  Campbell .................... 55/500
5,501,794  3/1996  Van de Graaf et al. ............ 55/497
5,618,324  4/1997  Sommer et al. ................. 55/497

FOREIGN PATENT DOCUMENTS

| 0 623 377 A1 | 11/1994 | European Pat. Off. | 55/497 |
| 35 29 579 A1 | 2/1987 | Germany | 55/497 |
| 43 23 523 A1 | 1/1995 | Germany | 55/497 |
| 2-174910 | 7/1990 | Japan | 55/497 |
| WO 94/01200 | 1/1994 | WIPO | 55/497 |
| WO 94/17897 | 8/1994 | WIPO | 55/497 |

*Primary Examiner*—C. Scott Bushey
*Attorney, Agent, or Firm*—Kenyon & Kenyon

[57] ABSTRACT

An accordion filter pack that is bendable in only one direction and is made of a flexible filter medium, the folds of which are capped in the lateral direction at both ends by a flexible sealing strip and which can be sealed by the sealing strip with respect to a housing. The accordion filter pack is joined on its longitudinal sides to a least one reinforcing element. The reinforcing element is joined to the sealing strip and consists of a flat, flexible planar structure that extends transversely to the openings of the folds.

6 Claims, 2 Drawing Sheets

ACCORDION FILTER PACK THAT IS BENDABLE IN ONLY ONE DIRECTION

BACKGROUND OF THE INVENTION

The present invention is directed to an accordion filter pack that is bendable in only one direction. The filter pack is made of a flexible filter medium, the folds of which are capped in the lateral direction at both ends by a flexible sealing strip, and which can be sealed by the sealing strip with respect to a housing. The accordion filter pack is joined on its longitudinal sides to a least one reinforcing element.

An accordion filter pack of this general construction is commonly known. When multiple-ply filter material is used, the inlet and outlet flow sides of the filter must not be confused, since the inadvertent backwards installation of the filter would greatly reduce its efficacy. Consequently, the installation of a filter insert in a housing must be unambiguous. For this purpose, for example, the receptacle of an accordion filter pack can be configured in the form of a semicircle. A further approach is to position the housing which receives the accordion filter pack at a very inaccessible point in the installation space. The filter must then be bent about an axis that runs transversely to the folds and transversely to the inlet flow direction (hereinafter referred to as the bending axis) in order to be inserted into the filter receptacle. If a corresponding accordion filter pack is configured to be bendable in only one direction, the required lack of ambiguity during installation follows. Previously known filter inserts which meet these requirements are configured so that strips of a hotmelt adhesive material are arranged on the folds, where they both serve as spacers and allow the filter insert to bend only with respect to the bending axis.

Accordion filters configured in this manner have several features that require improvement. Firstly the inlet flow area is decreased by the applied adhesive strips, and secondly the spacing between the folds is greatly limited, since otherwise the adhesive would flow, while still liquid, into the V-shaped openings of the folds. Moreover, a filter insert of this kind has proven to have poor stability, which particularly greatly limits handling during assembly and transport.

SUMMARY OF THE INVENTION

The present invention is directed to further development of an accordion filter pack that is bendable in only one direction in such a way that the inlet flow area is not decreased and the fold spacing can be varied over a wider range, while offering greater mechanical stability.

The accordion filter pack is made of a flexible filter medium, the folds of which are capped in the lateral direction at both ends by a flexible sealing strip. The ends of the folds can be sealed by the sealing strip with respect to a housing. The accordion filter pack is joined on its longitudinal sides to a least one reinforcing element, which in turn is joined to the sealing strip.

In the present invention, the reinforcing element is joined to the sealing strip and consists of a flat, flexible planar structure that extends transversely to the openings of the folds. The width of the reinforcing element is preferably less than the height of the filter. According to one advantageous embodiment, the reinforcing element is joined off-center to the end surfaces of the folds. Depending on whether the strip allows compression or elongation, it is to be fastened on the side of the end surfaces facing toward or away from the bending axis. The stiffness with respect to the bending axis can be varied by means of this asymmetrical arrangement.

Joined to the reinforcing element that is fastened on the longitudinal sides of the accordion filter is a sealing strip that, after insertion of the filter pack into a corresponding receptacle, assures sealing between the raw gas and purified gas sides. The reinforcing element is thus arranged so that the inlet flow area of the filter is not decreased. The installation width of the accordion filter is the same as that for an accordion filter without reinforcing element. It has also been found that mechanical stability is substantially greater than is the case for the previously known filter pack, so that handling during transport and assembly is substantially simplified.

An advantageous embodiment of the filter pack according to the invention provides for the planar structure to consist of nonwoven mat. The nonwoven mat strips offer the advantage that both welding and adhesive bonding can be applied to them. This results in greater flexibility in terms of production. The alternative between welding and adhesive bonding also increases the spectrum of possible environmental conditions under which an accordion filter pack according to the invention can be used. Filter stiffness can be influenced by modifying the thickness of the nonwoven mat strips, such that stiffness is increased when thicker strips are used.

A further advantageous embodiment provides for the planar structure to consist of a film made of thermoplastic material. With regard to possible environmental conditions, such as for example the temperature and humidity of the medium being filtered, its chemical composition, etc., it may be advisable to manufacture the planar structure from a thermoplastic material. Moreover the stiffness of the filter can be further increased by using such materials.

The planar structure is advantageously enclosed on both sides by the sealing strip. Sealing between the end surface of the accordion filter pack and the corresponding walls of the filter receptacle can be improved by the fact that the sealing strip encloses the reinforcing element on both sides. Flow resistance with respect to the filter material is increased by means of the wider sealing strip, so that unfiltered flow bypassing the filter medium from the raw gas to purified gas side is prevented.

DETAILED DESCRIPTION

Figure 1:
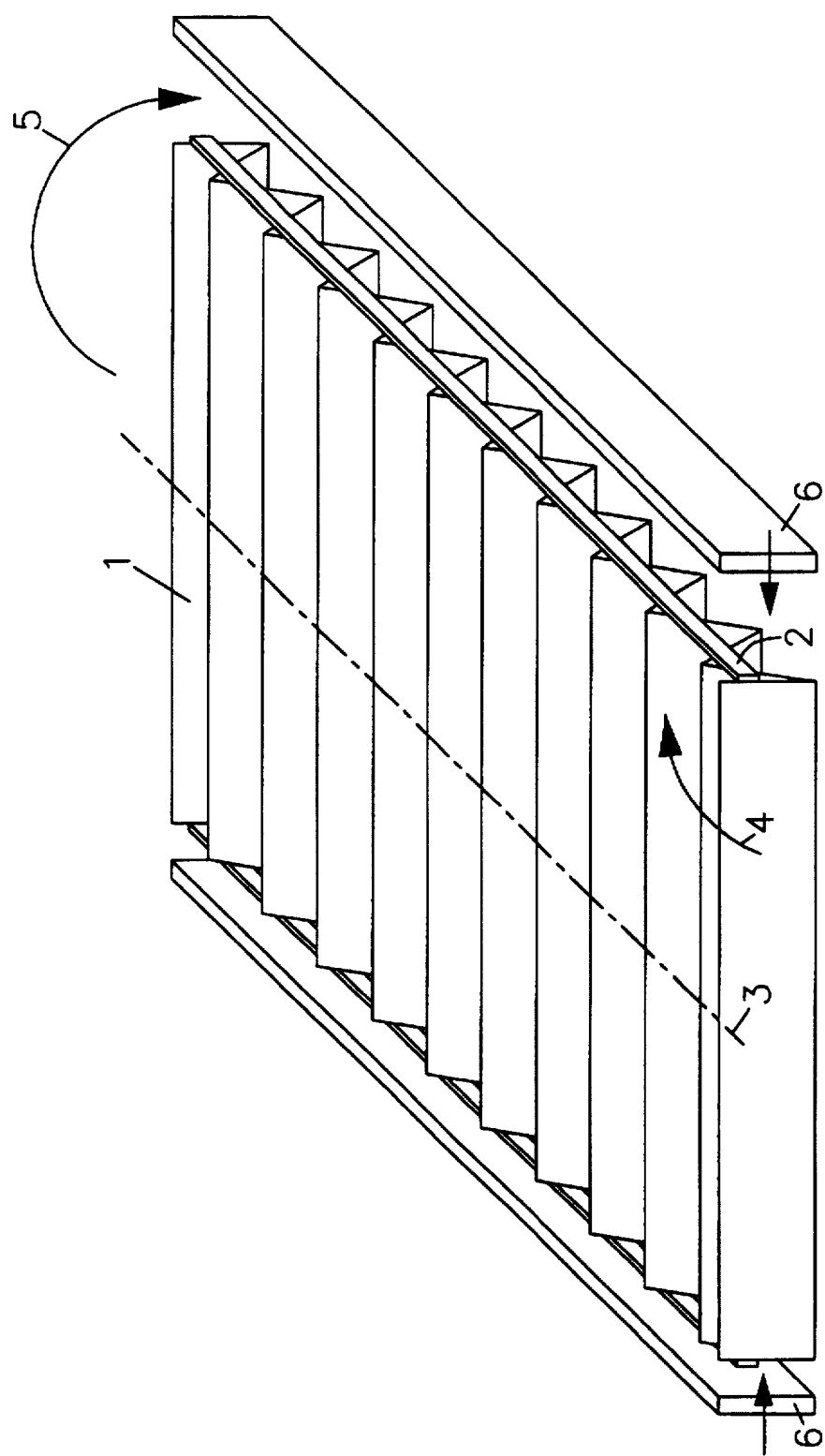
FIG. 1 is a perspective view of an embodiment of a filter constructed according to the principles of the invention.

FIG. 1 depicts a pleated filter medium 1 on whose end surface a reinforcing element 2 is fastened. FIG. 1 shows the accordion filter pack in an intermediate production stage. For completion, a sealing strip 6 is adhesively bonded over the ends and the reinforcing elements. Reinforcing element 2 extends parallel to longitudinal axis 3 of the filter, and transversely to the openings of the folds. The result of the asymmetrical, i.e. off-center, arrangement with respect to the height of the filter is that because of the extensibility and incompressibility of the strip, the accordion filter pack is bendable only in one direction. Under these conditions, the accordion filter pack is bendable toward the direction in which the tips of the folds are at the greater distance from reinforcing element 2.

Figure 2:
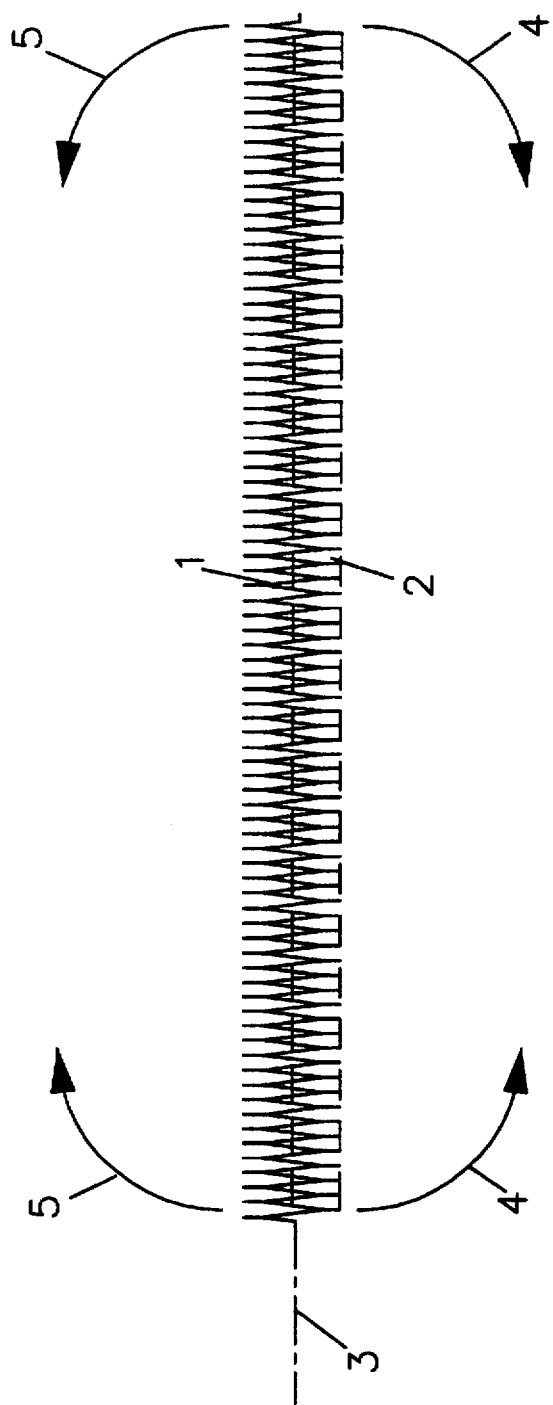
FIG. 2 is a side view of a pleated filter medium on whose longitudinal sides a reinforcing element is fastened asymmetrically, and further illustrates possible folding directions.

FIG. 2 illustrates the possible bending directions 4, 5 of the accordion filter pack. Bending is intended to be possible, with respect to an axis that extends perpendicular to the inlet flow direction and perpendicular to the longitudinal axis of the filter, in only one direction 4. It is the arrangement of reinforcing elements 2 that allows bending only in one direction 4. No bending in any further directions 5, i.e. including about the longitudinal axis of the filter, i.e. twisting, is possible.

What is claimed is:

1. An accordion filter pack that is bendable in only one direction, comprising:

a flexible filter medium having two longitudinal sides and folds extending therebetween in a lateral direction:

two reinforcing elements each comprising a flat, flexible planar structure that extends transversely to the openings of the folds, one such reinforcing element being joined onto each of the longitudinal sides of the flexible filter medium in a manner that divides the sides into two longitudinally extending unequal portions, thereby permitting the filter pack to bend in only one direction; and a flexible sealing strip mounted onto each of the reinforcing elements so that the sealing strip can seal the reinforcing element against a housing.

2. An accordion filter pack as defined in claim 1, wherein the planar structure reinforcing element is made of a nonwoven mat material.

3. An accordion filter pack as defined in claim 1, wherein the planar structure of the reinforcing element comprises of a film made of thermoplastic material.

4. The accordion filter pack as defined in claim 1, wherein the sealing strip prevents fluid from moving between the reinforcing element and the filter.

5. The accordion filter pack as defined in claim 2, wherein the sealing strip prevents fluid from moving between the reinforcing element and the filter.

6. The accordion filter pack as defined in claim 3, wherein the sealing strip prevents fluid from moving between the reinforcing element and the filter.

* * * * *